United States Patent [19]

Cadwell

[11] Patent Number: 5,048,165
[45] Date of Patent: Sep. 17, 1991

[54] METHOD FOR CONTROLLING THE SENSITIVITY AND LINEARITY OF CAPACITIVE TRANSDUCER SYSTEMS

[75] Inventor: Robert M. Cadwell, Sunnyvale, Calif.

[73] Assignee: Dresser Industries, Inc., Dallas, Tex.

[21] Appl. No.: 471,205

[22] Filed: Jan. 26, 1990

Related U.S. Application Data

[63] Continuation-in-part of Ser. No. 304,344, Jan. 30, 1989, and a continuation-in-part of Ser. No. 304,359, Jan. 30, 1989, and a continuation-in-part of Ser. No. 462,448, Jan. 18, 1990.

[51] Int. Cl.⁵ .............................................. H01G 5/16
[52] U.S. Cl. ...................... 29/25.41; 29/593; 73/718; 340/870.37
[58] Field of Search .................... 29/25.41, 593; 340/870.37; 73/715, 717, 718; 361/283; 338/4

[56] References Cited

U.S. PATENT DOCUMENTS

| | | |
|---|---|---|
| 3,341,794 | 9/1967 | Stedman ................................. 338/4 |
| 3,405,559 | 10/1968 | Moffatt ................................. 73/398 |
| 3,800,264 | 3/1974 | Kurtz et al. ............................ 338/2 |
| 4,158,217 | 6/1979 | Bell ...................................... 361/283 |
| 4,234,361 | 11/1980 | Guckel et al. ....................... 148/186 |
| 4,236,137 | 11/1980 | Kurtz et al. ............................ 338/4 |
| 4,295,376 | 10/1981 | Bell ...................................... 73/724 |
| 4,542,435 | 9/1985 | Freud et al. ........................ 361/283 |
| 4,542,436 | 9/1985 | Carusillo ............................. 361/283 |

OTHER PUBLICATIONS

A Miniature Electrical Pressure Gage Utilizing a Stretched Flat Diaphragm, John L. Patterson, Technical Note 2659, National Advisory Committee for Aeronautics, Apr. 1952.

"Structural Isolation of a Constrained Diaphragm", *Instruments and Control Systems*, R. A. Schaffzin, Apr. 1972.

"Properties of Electromechanical Device Utilizing Thin Silicon Diaphragms", S. Pennington et al., University of Wisconsin-Madison.

*Primary Examiner*—Carl E. Hall
*Attorney, Agent, or Firm*—Richards, Medlock & Andrews

[57] ABSTRACT

Inherent capacitive-type nonlinearities in a capacitive displacement transducer can be eliminated or reduced by the introduction of an oppositely-sensed nonlinearity. The oppositely sensed nonlinearity is introduced by selecting a diaphragm thickness to define a stiffness such that there is an increased resistance to deflection. The increased resistance to deflection generates a nonlinearity which decreases with increasing input to offset an oppositely sensed inherent nonlinearly which increases with increasing input, thereby balancing the nonlinearities and achieving an overall linear output.

38 Claims, 5 Drawing Sheets

FIG.10

METHOD FOR CONTROLLING THE SENSITIVITY AND LINEARITY OF CAPACITIVE TRANSDUCER SYSTEMS

RELATED APPLICATIONS

This is a continuation-in-part application of prior U.S. patent applications identified as "High Sensitivity Miniature Pressure Transducer", Ser. No. 304,344, filed Jan. 30, 1989; "Precision Transducer Circuit and Linearization Method", Ser. No. 304,359, filed Jan. 30, 1989; and "Precision Capacitive Transducer Circuits and Methods", Ser. No. 462,448, filed Jan. 18, 1990, all incorporated herein by reference.

TECHNICAL FIELD OF THE INVENTION

The present invention relates in general to transducers, and more particularly to the design and construction of transducer systems so that optimized results are realized, especially with regard to linearity and sensitivity.

BACKGROUND OF THE INVENTION

Many kinds of transducers have been devised for converting a variety of physical effects (acceleration, force, pressure, etc.) into corresponding movements of a transducer element with respect to one or more other fixed elements. The relative position of the moving element is a measure of the physical effect. One common method for determining the position of the moving transducer element is to measure the electrical capacitance between it and one or more fixed elements.

Figure 1:
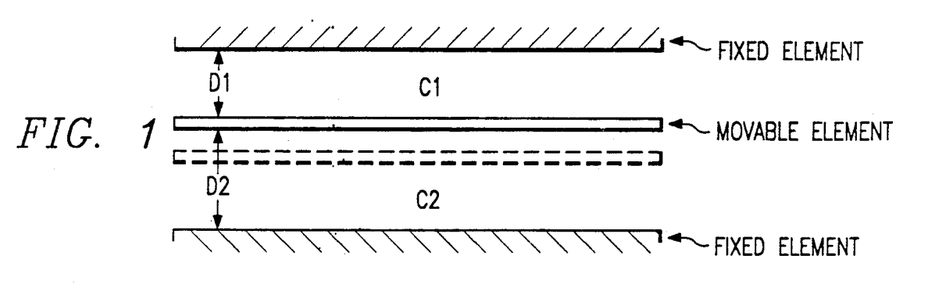
FIG. 1 is a generalized depiction of a capacitive displacement transducer.

FIG. 1 shows a cross section of an idealized transducer having a movable plate positioned between a pair of fixed plates. The plates are flat, conductive and of equal area, and otherwise of symmetrical structure. The capacitance between the movable plate and either fixed plate is inversely proportional to their separation. Thus, the position of the movable plate can be determined by measuring the capacitances.

The performance characteristics of such a transducer can be expressed in terms of its capacitances. However, a practical transducer system includes some form of electronics to convert capacitance changes into a more useful form of information, typically voltage. This conversion itself also influences the performance characteristics of the combination.

The overall "sensitivity" of a transducer system as used herein means the change in electrical output caused by a change in physical input. Preferably, changes in output should be linearly related to changes in input. It is significant to realize that the introduction of scaling factors, such as gain, into the system do not affect the linearity.

The sensitivity of a capacitive transducer system can be considered as the product of three independent factors:

Factor 1 is the change of position (displacement) of the movable element for a change of physical input.

Factor 2 is the change of capacitance(s) for the change of position (displacement).

Factor 3 is the change of electrical output for the change of capacitance.

The first two factors relate to the characteristics of the transducer and the third to the characteristics of the electronics.

It is desirable to increase the sensitivity of the transducer so as to minimize the effects of mechanical and electronic imprecision. This can be achieved by increasing factor 1, the displacement of the movable element for a given change of physical input (for instance, by reducing the internal forces restraining the displacement), or by increasing factor 2, the change of capacitance for a given displacement (for instance, by reducing the separation between the movable element and the fixed plates), or both. Either action causes the displacement to be a larger fraction of the separation for a given change of physical input. Thus, it is desirable to maximize the quantity (displacement/separation).

The influence of each of the three factors can be appreciated by referring again to the ideal transducer of FIG. 1. It is assumed that the displacement of the movable element from the center, or null, position is proportional to the physical input (factor 1). The distance (D1−D2) is proportional to this displacement. Since, by definition, the capacitance between two parallel plates is inversely proportional to their separation, capacitance C1 is inversely proportional to D1 and capacitance C2 is inversely proportional D2 (factor 2). If the change of electrical output is made proportional to (1/C1−1/C2), factor 3, it will be proportional to the physical input. Thus, the electrical output will be zero when the physical input is zero (no displacement) and increase in direct proportion to increases of the physical input. The sensitivity, or the change of electrical output for a change of physical input, will be constant and independent of the value of the physical input. In other words, there will be zero nonlinearity. The sensitivity can be increased by increasing the quantity (displacement/separation) without introducing nonlinearity. In this idealized system, each of the three factors contributing to the linearity of the system is itself linear.

The ideal case of high sensitivity and zero nonlinearity cannot be achieved in practical transducer systems. Basic limitations exist which reduce the sensitivity and increase the nonlinearity. Further, sensitivity and nonlinearity become interrelated, and improvements of one lead to degradation of the other.

Each of the above mentioned three factors affecting sensitivity and linearity are influenced by different limitations. An example of each is described below, showing the resulting deviation from ideal performance.

A limitation affecting factor 2, the change of capacitance for a change of position, is introduced by unavoidable extraneous capacitance(s) between the movable element and the fixed capacitor plate(s). This can occur both within the transducer itself and in the external connections to the measuring electronics. The extraneous capacitance(s) are in parallel with the transducer capacitance(s) C1 and C2, creating an effective transducer capacitance which is just the sum of the two. The electronics react to this effective capacitance and are unable to separate the effects of the transducer and extraneous capacitance(s). Since the extraneous capacitance(s) do not vary in response to the position of the movable element, the relationship between the effective transducer capacitance(s) and the position of the movable element, and the corresponding physical input, is altered.

Figure 2:
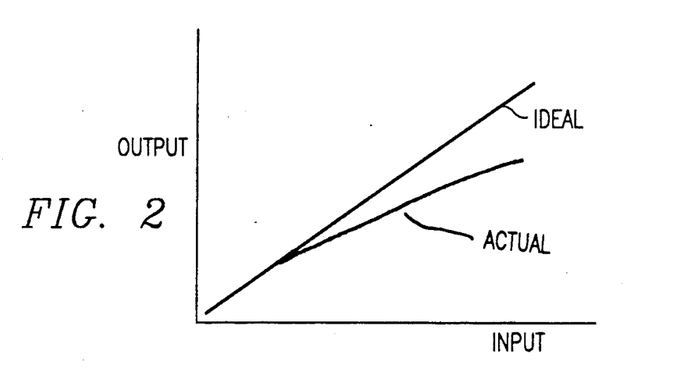
FIG. 2 is a graphical depiction of ideal versus actual transducer characteristics, as concerns sensitivity.

The effect of the extraneous capacitance(s) on the overall system sensitivity and linearity depends upon the electronic algorithm used for factor 3. Even if the change of electrical output for a change of capacitance is made proportional to (1/C1−1/C2), which is preferably the best choice for minimum nonlinearity, the extraneous capacitance(s) will still cause a reduction of sensitivity and an increase of nonlinearity. The sense of the nonlinearity is that the sensitivity will increase for increasing input, as shown in FIG. 2. Further, if the sensitivity is increased by increasing the quantity (displacement/separation), the nonlinearity will increase.

This effect of extraneous capacitance becomes increasingly important when the capacitance of the transducer is decreased through miniaturization, as the extraneous capacitance becomes larger with respect to the transducer capacitance.

Extraneous capacitance functions as a part of the transducer capacitance which does not respond to the physical input. In general, a limitation to ideal performance exists whenever all portions of the transducer capacitance do not respond equally to the physical input.

This limitation can affect factor 1, the change of position (displacement) of the movable element for a change of physical input, when the displacement of all regions of the movable element is not the same for changes of the physical input. This non-uniform displacement causes the sensitivity to become nonlinear, and the sense of this nonlinearity is again that the sensitivity will increase for increasing input.

An example of this limitation is the introduction of a suspension element(s) which mechanically locates the movable element with respect to the fixed elements. The displacement of the suspension element(s) will vary from full displacement at the connection to the movable element, to no displacement at the connection to the fixed elements. To the extent that the suspension element(s) are included as part of the capacitance of the sensor, the effect will be to increase the nonlinearity. The sense of the nonlinearity is that the sensitivity will increase for increasing input.

Figure 3:
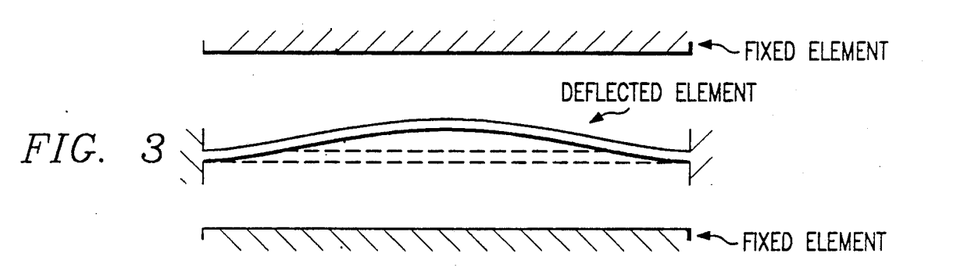
FIG. 3 is a simplified view of a clamped diaphragm transducer, with the diaphragm displaced in response to an input stimulus.

A more complex example of this limitation is the case where the movable element and its suspension elements merge into a clamped diaphragm, as shown in FIG. 3. A circular deflectable diaphragm is attached at its periphery to a fixed structure. Two capacitor plates are located with respect to the fixed structure on either side of the diaphragm at nominally equal distances. A difference of pressure is applied across the diaphragm, causing it to bend toward one fixed capacitor plate and away from the other.

Even if the displacement of every region of the diaphragm is itself directly proportional to pressure input, all regions of the diaphragm do not deflect equally. The curved diaphragm itself exhibits non-uniform displacement and thus creates a nonlinearity. It is virtually impossible to exclude the offending regions of the diaphragm from the transducer capacitance since all regions behave in this fashion. Thus, the sensitivity will be nonlinear, and the sense of this nonlinearity is again that the sensitivity will increase for increasing input.

As in the previous example, if the sensitivity is increased by increasing the quantity (displacement/separation), the nonlinearity will increase.

A limitation affecting factor 3, the change of electrical output for a change of capacitance, is introduced by the choice of the algorithm defining the conversion of transducer capacitance to electrical output. As previously shown, making the output proportional to $(1/C1-1/C2)$ produces a linear output for an ideal transducer and is thus the best choice. If, for example, the output of an ideal transducer system were made proportional to $(C1-C2)$, the sensitivity would be very nonlinear for significant displacements, approaching infinity as the movable plate approached one of the fixed plates. Thus, the choice of the electronic conversion algorithm significantly affects nonlinearity. As before, the sense of this nonlinearity is that the sensitivity will increase for increasing input. And as before, if the sensitivity is increased by increasing the quantity (displacement/separation), the nonlinearity will increase.

These practical limitations of performance in practical capacitance transducer systems all function to reduce sensitivity and increase nonlinearity. The sense of the nonlinearity is always an increase of sensitivity for increasing input.

The usual practice to reduce this nonlinearity is to use relatively low values of the quantity (displacement/separation); that is, to restrict the displacement of the movable element to a small fraction of the separation between the elements. Unfortunately, this also causes a reduction of sensitivity. Since nonlinearity will approach zero only when the displacement approaches zero, an attempt must be made to obtain an acceptable compromise between nonlinearity and sensitivity. As sensitivity is reduced, mechanical stability and precision become increasingly critical since the displacement for a given input is reduced. Also, electronic stability and noise become increasingly critical since the signal level for a given physical input is reduced. These problems become even more critical as the size of the transducer is reduced.

In principle, linearity can be improved by the use of compensating nonlinearities in factor 3, the conversion of changes of capacitance to changes of electrical output. However, no linear homogeneous function of the transducer capacitance(s), or ratio of such functions, will cause the sensitivity to decrease for increasing input, and thereby offset the nonlinearities described above. This forces the use of nonlinear functions, and the attendant added cost and complexity. The complexity of the required circuits increases dramatically as the accuracy of the correction increases, making this alternative practical only for transducers of moderate performance or high cost.

U.S. Pat. Nos. 4,542,436 and 4,858,097 illustrate measures taken in an attempt to reduce nonlinearities in capacitive-type sensors. In U.S. Pat. Nos. 4,054,833; 4,295,376; and 4,386,312, circuit design techniques have been implemented for either reducing nonlinearities generally inherent in sensor circuits, or for compensating for nonlinearities generated within the circuit itself.

From the foregoing, it can be seen that a need exists for a solution which provides high sensitivity and low nonlinearity without introducing additional cost or complexity.

A need also exists for a technique to obtain essentially zero nonlinearity over the performance range of the transducer, without unduly compromising the magnitude of the sensitivity.

A need also exists for a technique to obtain essentially zero nonlinearity when using non-ideal electronic conversion algorithms.

A further need exists for a technique which allows increasing the quantity (displacement/separation) without unduly compromising the magnitude of the nonlinearity.

A further need exists for a technique in which a nonlinearity of one sense can be introduced into the fabrication of the transducer device to offset the inherent nonlinearities of the opposite sense due to the effects of extraneous capacitance, non-uniform displacement and non-ideal electronic conversion algorithms.

SUMMARY OF THE INVENTION

In accordance with the invention, there is disclosed a method and corresponding apparatus for constructing a transducer and associated system in which nonlinearities can be made substantially independent of sensitivity. Indeed, the parameters which accomplish this can be varied so that the sensitivity of the system can be increased or adjusted while yet maintaining control over the extent of nonlinearity introduced into the system.

Figure 4:
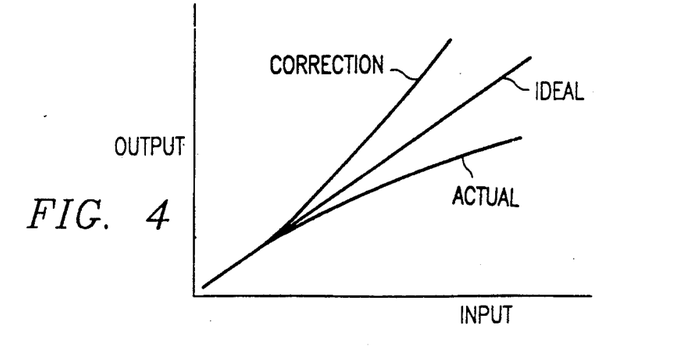
FIG. 4 is a graphical depiction of inherent nonlinearities which tend to increase sensitivity with increasing input, and the introduction of nonlinearities of an opposite sense which decrease sensitivity with increasing input.

In accordance with the invention, the well known increase in sensitivity with increasing input can be eliminated by introducing an equal and opposite nonlinearity to offset the traditional upturned curve shown in FIG. 2. By employing the invention, one need not sacrifice sensitivity or employ complex electronic corrections to improve the linearity of the transducer system. Rather, sensitivity can be increased and nonlinearity can be decreased or adjusted by varying a correction parameter which exhibits a characteristic which decreases sensitivity with increasing input, as illustrated by the downturned curve in FIG. 4. FIG. 4 shows the required correction which introduces a decrease of sensitivity with increasing input. This effect can be adjustable to match the otherwise inherent nonlinear sensitivity of the transducer. If the correction is made accurately, the sensitivity of the system can actually be increased while maintaining essentially zero nonlinearity. A method for achieving this result is described below.

It is well known that as materials are stretched, and in the preferred embodiment a diaphragm material, the stiffness, or resistance to further displacement, increases. As the displacement increases, the rate of increase of displacement for a given rate of increase of applied force decreases. This nonlinearity of the conversion of input force to displacement may be negligible for displacements small compared to the thickness of the material, but such nonlinearity increases rapidly as the displacement increases in relation to the thickness.

In this region of operation of the material, the displacement at any location on the material is a fixed fraction of the maximum displacement. That is, the "shape" of the material, in a mechanical sense, does not substantially change as displacement changes. In the preferred embodiment, the material at every location of the diaphragm displaces in some fixed proportion to every other location.

As displacement increases further, additional effects are introduced, and the "shape" of the material changes. In this region of operation of the material the advantages of the invention are believed to be less pronounced.

If the materials controlling the displacement of the movable element of the transducer are selected so as to introduce such nonlinearities in the conversion of input to displacement, the effect on the transducer sensitivity is to decrease the sensitivity for increasing input, which is exactly the offsetting effect desired. The nonlinear parameter can be incorporated into a suspension system for the movable element, or it can be incorporated into the entire movable element itself, such as with a clamped diaphragm.

In the preferred embodiment of the invention, the method for adjusting this displacement nonlinearity to correct the otherwise nonlinear performance of the transducer system comprises selection between different choices of the diaphragm thickness and the separation between the clamped diaphragm and the fixed capacitor plate(s).

The effect of these two parameters can be appreciated by realizing that increasing the quantity (displacement/separation) increases nonlinearity in the sense that sensitivity will increase for increasing input, and increasing the quantity (displacement/diaphragm thickness) increases nonlinearity in the opposite sense. The displacement is common to both quantities. For a given displacement, then, the separation and diaphragm thickness control nonlinearities of opposite sense, and these two parameters can be adjusted to produce zero nonlinearity independent of the magnitude of the sensitivity.

BRIEF DESCRIPTION OF THE DRAWINGS

Further features and advantages will become apparent from the following and more particular description of the preferred embodiment of the invention, as illustrated in the accompanying drawings in which like reference characters generally refer to the same parts or functions throughout the views, and in which.

DETAILED DESCRIPTION OF THE INVENTION

An empirical method for implementing the principles and concepts of the invention is to construct a large number of transducers with various parameter values and evaluate the results. Due to the large number of variables involved in an actual transducer, and the complexity of the effects, this empirical method would be extremely time consuming and costly, and little insight would be gained to allow adjustment of the parameters in general to obtain the desired results.

The preferred approach is to create a mathematical model of the transducer system to quantify the effects involved. Parameters of the model can then be adjusted to obtain the desired performance. In particular, the parameters which effect the nonlinear displacement of the movable element are adjusted to correct the otherwise nonlinear sensitivity of the transducer system. Construction and test of a few actual transducers can be used to verify the predictions of the model.

The model should accurately predict the relationship between the electrical output and the physical input. The model can be constructed from a set of sub-models each of which depict a particular contribution to the result. The preferred approach is as follows:

A) Define a sub-model to determine the position of the movable element(s) of the transducer as a function of the physical input.

B) Define another sub-model to determine the resultant capacitance(s) of the transducer as a function of the position of the movable element(s).

C) Define yet another sub-model to determine the resultant electrical output as a function of the resultant capacitance(s).

The desired model is the product of these sub-models:

$$\frac{\text{electrical output}}{\text{physical input}} = \frac{\text{position}}{\text{physical input}} \times \frac{\text{capacitance}}{\text{position}} \times \frac{\text{electrical output}}{\text{capacitance}}$$

This model is used to predict the performance of a proposed transducer design. The physical input is incremented to find the sensitivity and linearity of a design, and appropriate parameters are adjusted to provide the desired performance. In particular, appropriate parameters are adjusted so that the nonlinearities introduced by such factors as extraneous capacitance and non-uniform displacement are compensated by the nonlinearity introduced by the nonlinear displacement effect of the materials controlling the displacement of the movable element.

Figure 5:
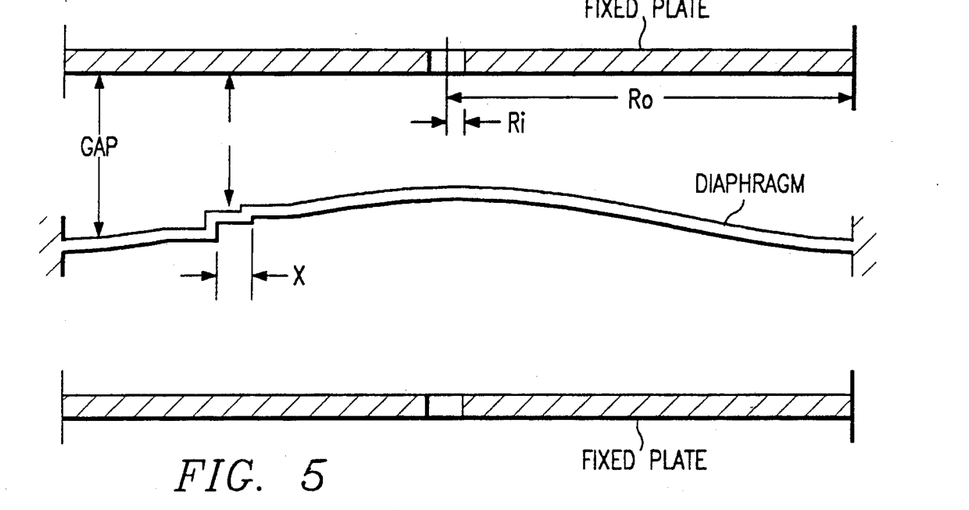
FIG. 5 illustrates an enlarged view of a displaced transducer diaphragm, and the techniques for analyzing the displacement at various regions thereon.

A detailed description of a model is presented below for the case of a pressure transducer with a circular silicon diaphragm of uniform thickness, and nominally centered between two circular capacitor plates, as shown in FIG. 5. This case provides an extreme example of non-uniform displacement. Those skilled in the art, having available this disclosure, can readily develop other models for other types of transducer systems.

The first step, A), is to define a sub-model describing the displacement of the diaphragm as a function of the applied pressure. The need to determine the displacement of a diaphragm is common to many fields, and many models have been developed. The model employed in the present invention is derived from a paper entitled "Elastic Elements of Instruments" by L. E. Andreeva, translated from Russian by Israel Program for Scientific Translations, 1966.

The displacement of the diaphragm is determined by first determining the maximum (center) displacement of the diaphragm caused by an applied pressure, and then determining the displacement of every other region of the diaphragm for the same applied pressure.

The maximum (center) displacement, Wp, is derived from $$P = E \frac{t^4}{R^4} \left[ a \frac{Wp}{t} + b \frac{Wp}{t} + c \frac{Wp^3}{t^3} \right]$$

where coefficients a, b, c are $$a = \frac{16}{3(1-u^2)}, \quad b = \frac{4eR^2}{(1-u)t^2}, \quad c = \frac{7-u}{3(1-u)}$$

and the parameters and corresponding units of measure are
Wp=peak (center) displacement (mils)
P=pressure (psi)
t=diaphragm thickness (mils)
R=outer radius of diaphragm (mils)
E=Young's modulus ($26.2284 \times 10^6$ psi for bulk silicon)
u=Poisson ratio (0.2833533)
e=radial prestrain (microstrain)

The pressure/displacement equation defined above describes the displacement at the center of the diaphragm as a function of the applied pressure and the diaphragm dimensions.

The displacement of every other region of the diaphragm is determined by describing the displacement of each of a series of arbitrarily narrow concentric circular regions, or rings, of the diaphragm. The displacement will be some fraction of the center displacement, varying from unity at the center to zero at the clamped edge. Thus, the displacement, Wr, at some radius, is $$Wr = Wp \times SF$$

where SF is a "shape factor" which varies with the radius.

The shape factor is derived from $$SF = 1 + \frac{1}{(z-1)} \left[ 2 \frac{r^{(z+1)}}{R^{(z+1)}} - (z+1) \frac{r^2}{R^2} \right]$$

where
SF=shape factor
r=radius for calculation (mils)
R=outer radius of diaphragm (mils)
z=material constant "z" is an experimentally determined factor. For the region of operation of the material considered here, the "shape" does not change substantially with changes of displacement, so "z" is a constant. A value of approximately z=3 has been found suitable for thin silicon material.

The shape factor equation defined above describes the displacement of every region of the diaphragm as a fraction of the center displacement. Thus, the displacement of every region of the diaphragm is known as a function of the applied pressure and the diaphragm dimensions.

The second step, B), is to define a sub-model to determine the resultant capacitance(s) of the transducer as a function of the displacement of the diaphragm, as described above.

The general equation for the capacitance between two parallel plates is $$C = \frac{e\, e_o\, A}{D}$$

where
C = capacitance (microfarads)
A = area of plates (cm$^2$)
D = distance between plates (cm)
e = relative dielectric constant
$e_o = 8.85 \times 10^{-8}$ microfarads/cm In this case, the calculation is performed by considering the diaphragm to be a series of arbitrarily narrow concentric rings, each of which is parallel to the capacitor plate, as shown in FIG. 5. The distance between each ring and the capacitor plates is the separation with no displacement, minus the displacement for the ring, determined above. The total capacitance is the summation of the capacitance for all the rings contributing to the capacitance. This summation is bounded in the center by the hole in the capacitor plate having a radius $R_i$, and at the outside by the capacitor plate having a radius $R_o$. Thus, $$C = K e \sum_{R=R_i}^{R=R_o-x} \frac{(R + x)^2 - R^2}{S - D}$$

where
C = capacitance (pf)
$K = 1.669 \times 10^{-10}$
e = relative dielectric constant
R = radius to ring (mils)
x = width of ring (mils)
S = separation (microns)
D = displacement (microns)
$R_i$ = radius of capacitor plate hole (mils)
$R_o$ = radius of capacitor plate (mils)

This formula applies to both capacitances C1 and C2 with proper application of the algebraic sign of the displacement.

Any extraneous capacitances, in parallel with the transducer capacitances, are summed with these values to obtain the total effective transducer capacitances.

The third step, C), is to define a sub-model to determine the resultant electrical output as a function of the resultant capacitance(s).

This sub-model is simply the equation of the chosen algorithm defining the conversion from capacitance to electrical output. For instance, in the previous example of the ideal transducer, the sub-model would be $Output = G (1/C1 - 1/C2)$ where

*G = gain of electronics (volt-pf)*

The combination of the sub-models above represents the desired model of the transducer system.

It must be emphasized that this model is an example of the method applied to a particular transducer system design. Other models of this design are possible, and different transducer system designs may require different models.

The model contains the properties causing nonlinearities of both senses which may be balanced to obtain zero nonlinearity for the system.

If the equation which relates the center displacement of the diaphragm to the pressure is solved to determine the displacement, it will be found that this displacement is dependent upon the pressure raised to the first power, the expected linear relationship, and also dependent upon the pressure raised to higher powers, which represents the nonlinear displacement caused by the increasing stiffness with increasing input.

The effect of non-uniform displacement of the diaphragm is introduced by the "shape factor" equation. The effect of extraneous capacitance is introduced by inclusion in the conversion of diaphragm position to capacitance. And the effect of non-ideal electronic conversion of capacitance to output is introduced in the electronics sub-model. These three factors introduce higher-order terms relating output to pressure input, and these terms will produce a nonlinearity of the opposite sense to that introduced by the nonlinear displacement described above.

It has been found that the nonlinearities of transducer systems introduced by non-uniform displacement, extraneous capacitance and non-ideal electronic conversion algorithms arise due primarily to third order terms. The coefficients of these terms can be adjusted so that there is substantially a complete cancellation. In other words, the nonlinearities can be eliminated by selection of the structural elements of the transducer which correspond to the terms of the representative equations which define the nonlinearity of the opposite sense to that caused by non-uniform displacement, extraneous capacitance and non-ideal electronic conversion algorithms.

Due to the complexity of the model, the preferred approach for its use is to create a computer program which allows all the transducer system parameters to be input to the model, which determines the electrical output for increments of input pressure, and which reports the resulting sensitivity and nonlinearity. This is repeated for a range of parameters values, and the optimum values determined for the desired performance.

A large number of parameters is involved, and a method of organizing the data in a meaningful way is helpful to obtain practical results quickly. The preferred approach is to vary two parameters while holding all other parameters constant. The two variable parameters are chosen to have a strong influence on the two forms of non-linearity which must ultimately be balanced, and to be relatively easy to vary in the production of a practical transducer.

It is clear from the pressure/displacement equation above that the displacement and the non-linearity of the displacement are strongly dependent upon the diaphragm thickness, diameter and prestrain. Any and all of these parameters can be adjusted to affect the nonlinearity. However, in a typical design, the diameter is relatively constrained by factors such as cost and ease of manufacture. Also, changes of diameter are difficult to implement quickly as many elements of the transducer are affected by a diameter change. The value of prestrain is also constrained by factors such as assembly techniques and the properties of the materials.

The thickness of the diaphragm, however, is easily adjusted in manufacture and does not influence other parameters. It also has a relatively large control over the displacement nonlinearity noted above. It is therefore the preferred variable for use in adjusting the displacement nonlinearity.

The preferred parameter to control the nonlinearity introduced by extraneous capacitance(s) and the non-uniform displacement is the separation between the undisplaced diaphragm and the fixed capacitor plates. Since both the separation and the diaphragm thickness are controlled by the dimensions of one element of the transducer, the diaphragm structure, sensitivity and nonlinearity can both be controlled by adjusting the parameters of a single transducer element.

The preferred approach is to determine a range of performance results for a given transducer design, using the diaphragm thickness and separation as design variables. The results will indicate the value of one of the parameters for a given value of the other parameter to obtain the desired level of nonlinearity, and the resulting sensitivity. It has been found that the sensitivity can be increased while retaining zero nonlinearity, but the required accuracy of the resulting dimensions becomes more stringent, thus limiting the sensitivity attainable in a practical design.

Figure 6:
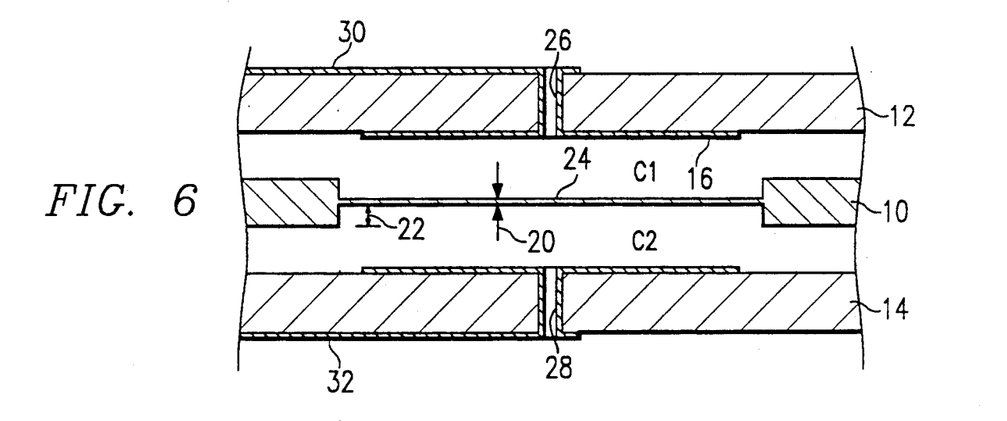
FIG. 6 is a cross-sectional view of a glass-silicon-glass transducer constructed in accordance with the invention.

In the preferred form of the invention, a clamped silicon diaphragm is fabricated. A silicon wafer 10 having a thinned area is fabricated and sandwiched between opposing support glass substrates 12 and 14, each having a capacitor plate 16 and 18 deposited or otherwise formed thereon. FIG. 6 illustrates such a transducer structure. The diaphragm is fabricated with silicon, using a silicon processing technique which allows both the diaphragm thickness and the capacitor gap parameters to be independently defined in a single series of processing steps. More specifically, the transducer structure shown in FIG. 6, with the layers separated from each other for ease of understanding, includes a silicon wafer 10 sandwiched between an upper glass substrate 12 and a lower glass substrate 14. The silicon wafer 10 undergoes a double-sided etch to form both the diaphragm thickness, shown as dimension 20, as well as a setback which defines the gap 22 between the thin silicon diaphragm 24 and capacitor plates 16 and 18 formed on the upper and lower glass substrates. The semiconductor material itself is doped with an impurity so that it is sufficiently conductive as to form a deflectable conductive capacitor plate which is common to both of the fixed capacitor plates 16 and 18. In this manner, movement of the silicon diaphragm 24 forms a differential capacitance of a first capacitance C1 between the silicon diaphragm 24 and the upper capacitor plate 16, and a second capacitance C2 between the silicon diaphragm 24 and the lower capacitor plate 18. As pressure is applied to the thin silicon diaphragm 24, it deflects one way or the other, depending upon the pressure differential across the diaphragm, thereby increasing one capacitance and decreasing the other. In such a structure, the total capacitance C1+C2 remains essentially constant.

The upper and lower glass support substrates 12 and 14 are essentially Pyrex-type glass structures which are masked on both sides thereof by metal deposition processing to form the capacitor plates 16 and 18, as well as respective conductive vias 26 and 28 which provide two functions. First, the vias 26 and 28 allow external fluids to act upon the diaphragm 24 to create a differential pressure thereacross, and deflect it. Secondly, the conductive vias 26 and 28 provide an electrical path from the respective capacitor plates 16 and 18 to conductors 30 and 32 on the opposite sides of the glass substrates. Electrical connections can be made to both the conductors 30 and 32, as well as to the silicon material 10 for sensing the change in capacitance in response to changes in pressure applied to the transducer. Preferably, a large number of such transducers are fabricated simultaneously by employing a large diameter silicon wafer and corresponding large diameter glass substrates. The glass and silicon materials are fabricated as shown and then electrosealed together for attaching such layers together. Such a seal forms a hermetic seal circumferentially around each diaphragm 24 to the respective glass support substrates 12 and 14.

With reference to the processing of the silicon 10, the wafer is first masked on each side thereof to define plural registered circular areas each having a diameter corresponding to the diameter of the diaphragms. A silicon etch is then conducted on both sides of the wafer to etch the silicon material to a desired depth, equivalent to the desired capacitor gap 22. Many etchants are available for etching masked silicon. For further details concerning the specific construction of an exemplary glass-silicon-glass capacitive transducer, reference is made to co-pending U.S. application entitled "High Sensitivity Miniature Pressure Transducer," identified above. The etch mask is then removed and the entire unmasked silicon wafer is again subjected to an etch, whereupon the silicon is uniformly removed on both sides of the wafer until a desired diaphragm thickness is achieved. The silicon material is removed at a known rate, and thus by time etching the wafer, desired diaphragm thicknesses 20 can be achieved without affecting the setback dimension 22. Indeed, diaphragm thicknesses 20 of 2-3 microns are possible. Those skilled persons referring to the prior art can readily devise of other techniques for fabricating diaphragms having predefined diaphragm thicknesses and offset dimensions.

As can be appreciated, the capacitor gap 22 is related to the output capacitance of the transducer, in that with a smaller gap, and with a given range of diaphragm deflections, the output capacitance is greater. This is because the spacing between the fixed capacitor plates and the diaphragm is smaller, thereby increasing the capacitance. Also, by adjusting the diaphragm thickness, a nonlinearity can be introduced into the transducer in a range which offsets an oppositely-sensed inherent nonlinearity due to extraneous capacitances, and the like. In other words, with increasing diaphragm deflections, due to increased input fluid pressures, the diaphragm material itself provides increased resistance to deflection and thereby provides the oppositely sensed nonlinearity.

Radial prestrain of the silicon diaphragm also affects deflection, which parameter can also be employed to linearize the output thereof. Radial prestrain of the diaphragm can be accomplished during the electrosealing of the silicon diaphragm material to the glass support substrates 12 and 14. By proper selection of the thermal expansion coefficients of the glass substrates 12 and 14, as compared to that of the silicon wafer 10, a desired prestrain can be incorporated into the diaphragm 24. Preferably, the thermal expansion of the bulky glass substrates 12 and 14 is less than that of the thin silicon material 10 at the sealing temperature. Thus, when the composite sandwiched glass-silicon-glass structure is heated to a predefined sealing temperature, and fixed together by electrosealing, and then allowed to cool, the diaphragm 24 maintains a prestrain. This can be realized in that once fixed at a high temperature to the glass supports 12 and 14, the silicon diaphragm 24 contracts more than the glass during the cooling stage. Depending on the differences between the thermal expansion coefficients and the selection of the temperature at which electrosealing occurs, different prestrains can be incorporated into the diaphragm 24.

Figure 7:
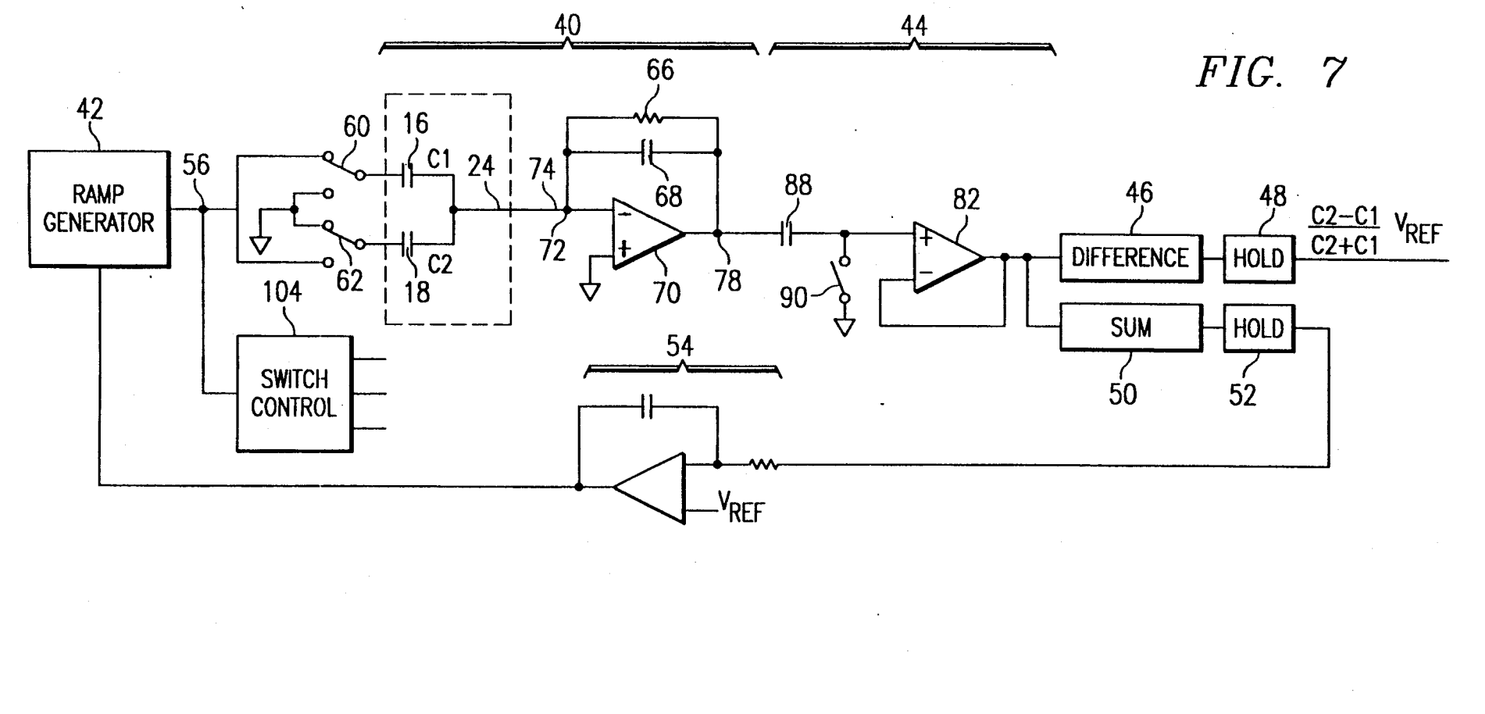
FIG. 7 is an electrical diagram of a circuit which converts transducer capacitance values to a corresponding electrical signal.

The output of a capacitive displacement transducer comprises a capacitance which varies in correspondence with a physical input, such as pressure. In order to provide an output which is usable with typical control systems, the capacitance is generally converted into a corresponding electrical signal. Numerous circuits have been devised for accomplishing this capacitance to electrical conversion. However, such circuits generally either introduce further nonlinearities into the system, or require highly complicated circuitry to provide reasonable linearity, thereby adding substantial cost to the system. FIG. 7 illustrates an electrical circuit well adapted for use with the transducer of the invention so that the capacitance to electrical conversion can be carried out while yet maintaining linearity, at a low or reasonable cost.

In order to maintain overall linearity of the transducer system, the measurement of the displacement of the movable member should be carried out using the difference of the reciprocal capacitances, i.e., $1/C1 - 1/C2$. As will be described more thoroughly below, the transducer capacitances, C1 and C2, are switched to the input of a differentiator to provide output representations of the capacitance reciprocals. A difference circuit is employed to provide a difference of the capacitance representations, while a summation circuit is employed to provide a feedback of the summation of the capacitance reciprocals to a ramp generator which drives the transducer capacitances. The effect of extraneous capacitances is eliminated by ensuring that the charging current flows only through the transducer capacitances and that the voltage measured is due only to the charging current.

While the direct measurement of the capacitance reciprocals can be easily carried out, circuit simplification can be achieved by measuring the capacitances themselves, rather than the reciprocal values. This can be seen by the following relationship:

$$\frac{\frac{1}{C1} - \frac{1}{C2}}{\frac{1}{C1} + \frac{1}{C2}} = \frac{C2 - C1}{C1 + C2}$$

Figure 8:
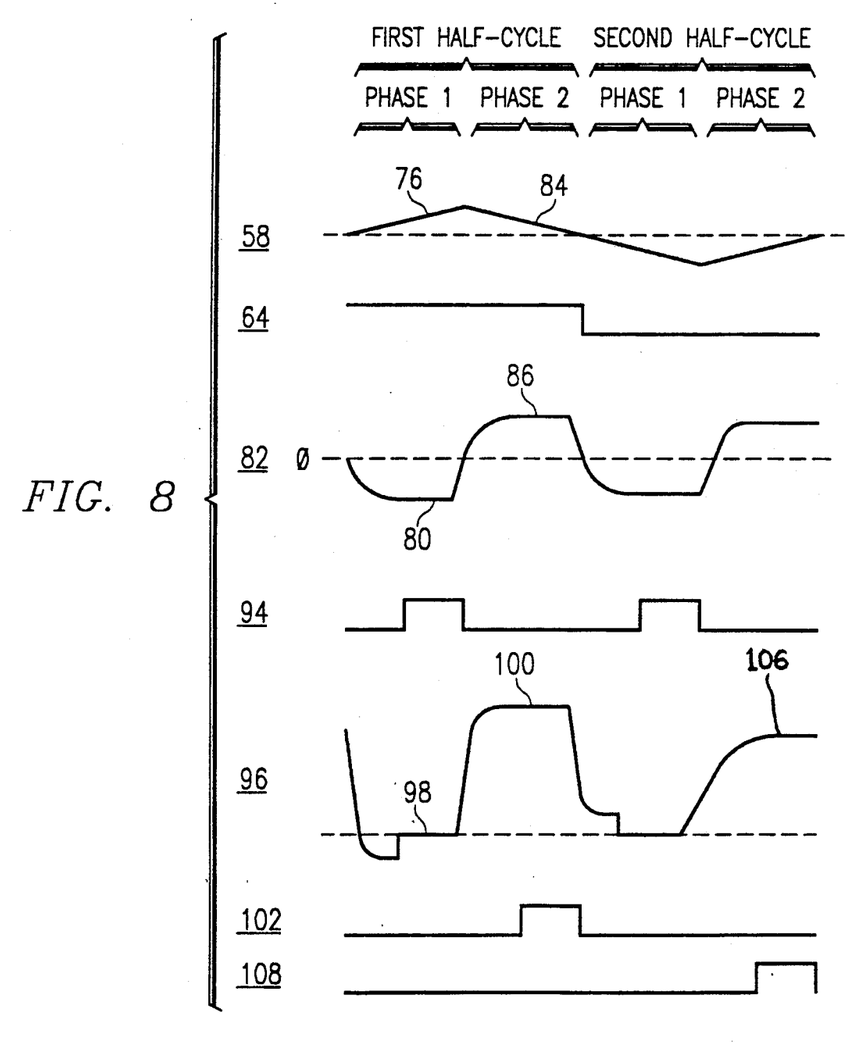
FIG. 8 is a series of waveforms which describe the operation of the circuit of FIG. 7.

Referring now to FIGS. 7 and 8, there is illustrated a circuit diaphragm and waveforms of the conversion circuit of the preferred embodiment of the invention. The transducer capacitances C1 and C2 are alternately switched to a differentiator circuit 40 and alternatively driven by ramp generator 42. Differentiator circuit 40 produces an output signal having an amplitude proportional to the transducer capacitance, and demodulator circuit 44 translates this signal to a ground reference. A difference circuit 46 derives the difference, (C1−C2), which is retained by a hold circuit 48. A sum circuit 50 derives the sum, (C1+C2), which is retained by a hold circuit 52. The sum is held constant by means of an integrator circuit 54, eliminating the need to provide actual division. Alternatively, a division method could be utilized, wherein the ratio of the difference and the sum is provided by a divider circuit.

Ramp generator 42 is of conventional design, providing an output at node 56 which is a triangular waveform 58 of alternating positive and negative voltage slopes. A complete measurement cycle comprising two alternate half-cycles. During the first half-cycle, switches 60 and 62, operated by waveform 64, are in the position shown. Such switches connect plate 16 of transducer capacitance C1 to the output of the ramp generator, and plate 18 of C2 to circuit ground. Differentiator circuit 40, comprises the transducer capacitance C1 and C2, resistor 66, capacitor 68 and differential amplifier 70. The non-inverting input of amplifier 70 is connected to the circuit ground for establishing the inverting input, node 72, at a virtual ground potential by means of feedback through resistor 66. The common lead 74 of the transducer connects movable element 24 to this node.

During the first part of the first half-cycle, phase 1, the output of the ramp generator, portion 76 of waveform 58, maintains a constant positive slope. The resulting constant rate of change of voltage across C1 induces a constant current through C1 and thus through resistor 66 to the output of amplifier 70. After a short stabilization time, the output of amplifier 70, node 78, stabilizes to a negative voltage level representative of the value of transducer capacitance C1, as shown by portion 80 of waveform 82. Frequency compensation of amplifier 70 may be required for a large value of resistor 66 or transducer capacitance, and is provided by capacitor 68.

The capacitance between input node 72 and circuit ground is comprised of stray capacitance associated with the transducer movable element 24, capacitance associated with the circuitry itself and transducer capacitance C2 which has been connected to ground by switch 62. As this node is at virtual ground, the voltage across this capacitance cannot change and substantially no current can flow through it, thereby preventing a diversion of the ramp signal current from transducer capacitance C1. Further, the current required to charge extraneous capacitance to ground associated with plate 16 of C1 is provided by the output of ramp generator 42 and does not affect the signal current developed through transducer capacitor C1.

Thus, the output of differentiator circuit 40, waveform 82, is unaffected by extraneous capacitances from the transducer elements to the environment and circuit input capacitance.

During phase 2 of the first half-cycle, the slope of the ramp generator output reverses, as shown at portion 84 of waveform 58. This causes the polarity of the output of differentiator circuit 40 to reverse, as shown at portion 86 of waveform 82.

Ideally, the levels of portions 80 and 86 of waveform 82, with due allowance for polarity, are proportional to C1 during both phase 1 and phase 2 of this first half-cycle. In practice, however, the input current of amplifier 70 may not be negligible as compared to the signal current developed through C1. This is particularly the case for the very small values of transducer capacitance encountered with miniature transducer designs. However, this amplifier input current flows equally and in the same direction through resistor 66 during both phase 1 and phase 2, the effect of which is simply to add a voltage offset to the differentiator output waveform 82. The peak-to-peak amplitude of this signal is not affected by this amplifier input current, and is thus an accurate representation of C1. An additional benefit of using the peak-to-peak value is that the signal level effectively doubles the value obtained during only phase 1 or phase 2 alone. Further, the effect of unequal ramp generator slopes, waveform 58, during phase 1 and phase 2 is unimportant as this will not affect the peak-to-peak output.

The peak-to-peak output voltage value generated for C1 by differentiator circuit 40 is converted to a ground referenced value by demodulator circuit 44, comprising coupling capacitor 88, switch 90 and differential amplifier 92. During the latter part of phase 1, switch 90 is closed by waveform 94 such that capacitor 88 is charged to the negative voltage level of portion 80 of waveform 82. Switch 90 is opened for the remainder of the first half-cycle, during which time the input to amplifier 92 is simply waveform 82 decreased by the negative voltage across capacitor 88, the overall effect of which is addition. This signal, waveform 96, appears at the output of amplifier 92 which functions as a unity gain buffer. During the latter part of phase 1, the level of this signal, portion 98, is at substantially zero volts. During the latter part of phase 2 of the first half-cycle, the level of this signal, portion 100, is the peak-to-peak output of differentiator circuit 40, which is proportional to transducer capacitance C1, now referenced to ground. This level is sampled by difference circuit 46 and sum circuit 50 at the time, as indicated by waveform 102.

A comparator (not shown) in switch control circuit 104 terminates the first half-cycle when the ramp generator output waveform 58 is approximately zero volts. This results in zero stored charge on C1, thereby preventing circuit transients when C1 and C2 are switched for the next half-cycle.

During the second half-cycle, switches 60 and 62 reverse the positions shown, as indicated by waveform 64, thus connecting transducer capacitance C2 to the ramp generator output and connecting C1 to circuit ground. The measurement process is repeated, and during the latter part of phase 2, the level of portion 106 of waveform 96 is proportional to transducer capacitance C2. This level is sampled by difference circuit 46 and sum circuit 50 at the time indicated by waveform 108. This completes the measurement cycle. The output of the system is characterized by the following relationship:

$$\frac{C2 - C1}{C1 + C2} V_{ref}$$

Thus, the output is the desired ratio of the difference and sum of C1 and C2, multiplied by the reference voltage, Vref. Circuit gain and transducer capacitance scaling have substantially no effect on the output. If a parameter not of interest changes, such as the dielectric coefficient of the transducer capacitances, the output of the feedback integrator circuit 54 will change so as to produce a different ramp slope which will return the output of the system to the value existing before the change. The change in the parameter not of interest is therefore negated and the output of the system is thus made responsive to the parameter of interest, in the preferred embodiment, the movement of the transducer element 24.

Figure 9:
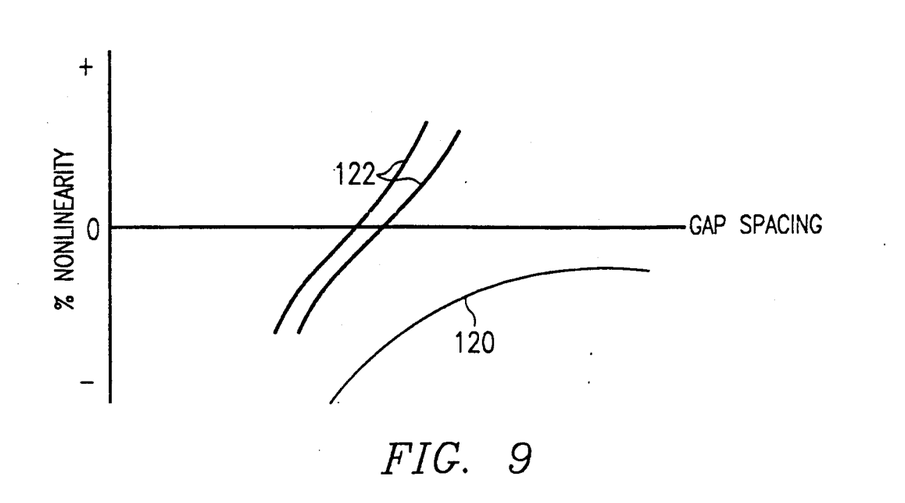
FIG. 9 graphically depicts the linearity achieved by employing the principles and concepts of the invention as compared with prior art techniques.

Shown in FIG. 9 is a graphical depiction of the linearity performance of a transducer employing the concepts and principles of the invention, as compared to transducers heretofore known. The vertical axis of the graph represents percent of nonlinearity, including both positive and negative values thereof. The horizontal axis of the graph represents the relative gap dimension between the movable element, or diaphragm 24, and the fixed capacitor plate. The lower curved line 120 generally represents the nonlinearity attendant with well known transducers. If extended, the line is asymptotic with both the horizontal and vertical axes. In other words, if the gap is made small, as is generally the case, the nonlinearity increases severely to an extent that it is intolerable. On the other hand, the linearity improves as the gap is made large. By increasing the gap spacing, the nonlinearity can be improved somewhat, until the transducer output capacitance is severely reduced. This can be appreciated as capacitance is inversely proportional to the gap spacing. Traditionally, transducer fabricators attempted to improve linearity to the extent that a wide gap spacing was permitted, and then further improved linearity by complex and costly electronic circuits.

The upper lines 122 in FIG. 9 illustrate the linearity achievable when diaphragm stiffness is employed as a nonlinear parameter to offset the other inherent nonlinearities, such as extraneous capacitance. As can be seen, the lines pass through zero nonlinearity, thereby indicating that by utilizing a proper choice of the structural parameters of the transducer, optimal linearity can be achieved. While the lines indicate the characteristics of a transducer having a defined diaphragm thickness, a family of such lines, all passing through zero, are available for transducers of different diaphragm thicknesses. Also, the slope of the lines corresponds to an output of the transducer system. Hence, while a greater output of the transducer system may be achieved, while yet attaining zero nonlinearity, the constraints on the tolerance of the capacitor gap becomes correspondingly restricted.

Figure 10:
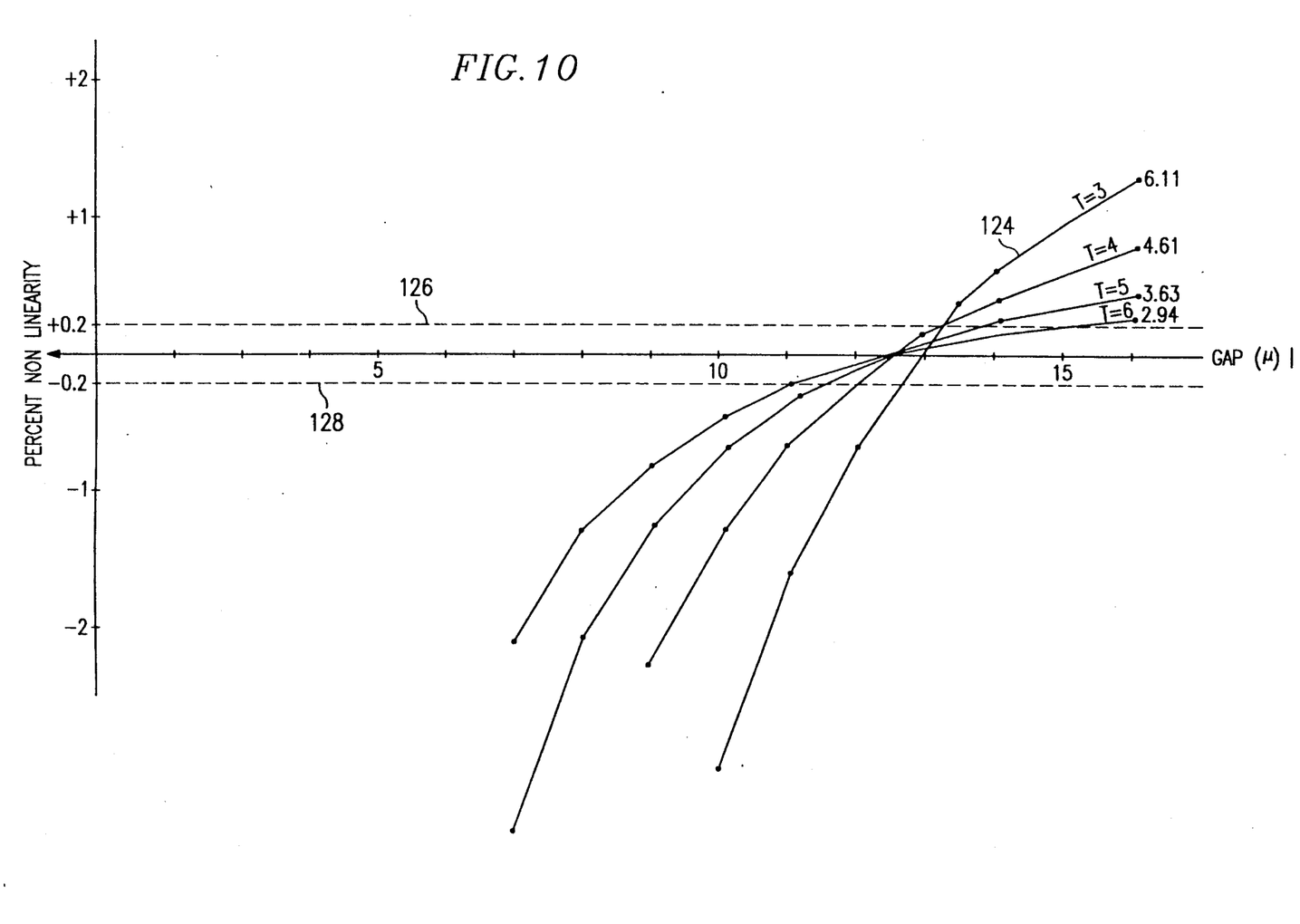
FIG. 10 illustrates percent linearity versus the diaphragm-capacitor plate separation for various parametric values of diaphragm thickness, all such values passing through a zero percent nonlinear area of the graph.

FIG. 10 shows the predicted nonlinearity (vertical axis) versus gap dimensions in microns (horizontal axis) for the indicated diaphragm thickness, T. The predicted relative output is shown numerically at the right for each curve.

For each diaphragm thickness, a range of gaps exists which produces a range of nonlinearities crossing through zero. The desired value of nonlinearity can be chosen by selecting the appropriate value of the gap. The output amplitude can be increased by selecting a thinner diaphragm and yet retain nonlinearity at a desired value. This results in smaller range of gaps which will satisfy the nonlinearity requirement.

It must be emphasized that this choice of parameters to be adjusted and the method of presenting the results are only examples. The increase of output and correction of nonlinearity made available by this method can be implemented in a variety of other ways using a variety of transducer designs.

More particularly, shown in graphical form are the operational results of a clamped diaphragm transducer employing the introduction of nonlinearities caused by the stiffness of the diaphragm 24. The graph shows the results of an exemplary transducer having a diameter of about 0.250 inch and a prestrain of about 40 microstrain. The transducer is of the type designed for pressure inputs of about three inches of water. Depicted is a family of curves, each associated with a different thickness of the diaphragm 24. Adjacent each line there is numerically shown the output of the transducer system, specified in volts, full scale. Importantly, each line of the family passes through zero nonlinearity, with corresponding capacitance gap and diaphragm thickness values which are within a practical range of use and fabrication of transducer devices. For example, by constructing a silicon diaphragm thickness of T=6 microns, and with an offset or gap of about 12.5 microns, zero nonlinearity can be achieved. More specifically, the transducer system remains linear over its full operating range, not just within a band. A transducer system output of about 2.94 volt is available with such a transducer construction. The upper line 124 has a slope which is much more steeply oriented than that of the other lines, and includes a correspondingly larger output of 6.11 volts. A transducer producing such an output, and having zero nonlinearity, has a transducer diaphragm thickness of about 3 microns and a gap of about 12.8 microns. As can be appreciated, thinner diaphragms can provide a wider degree of deflection for a given pressure, thereby providing an increased output capacitance, and thereby a larger system output voltage. The graphical lines intermediate those described define transducers having intermediate diaphragm thicknesses and providing intermediate output voltages.

Importantly, the output voltages associated with the graphical line are relative, and are independent of the particular type of circuit utilized for converting capacitance to voltage output. As can be seen from the graph, the output can be doubled simply by halving the thickness of the diaphragm, while yet obtaining zero or minimal nonlinearity. Nothing is changed in the circuitry to achieve this result. An important technical advantage of the invention is thereby achieved in which the linearity and output of the transducer system can be affected without modifying or changing the electronic conversion circuitry. The circuit employed in producing the characteristics of the graph of FIG. 10 was of the type defined above in connection with FIG. 7.

When fabricating a number of transducer diaphragm structures from a wafer of silicon material, it is often difficult to obtain uniform dimensional characteristics of the diaphragms over the entire wafer area. For instance, the etching rates may vary from batch to batch of silicon wafers, and may vary from the central areas thereof to the peripheral edges. Hence, not all diaphragms will have exactly the same thicknesses, nor the same offsets or capacitive gaps. It is thus more practical to define a range of acceptable nonlinearities such that the fabricated transducers fall somewhere within such range.

The two broken lines 126 and 128 shown in FIG. 10 depict a range of an acceptable nonlinearity of ±0.2%. Such a range is arbitrary and depends on the various applications or uses of the transducer. For example, with a diaphragm thickness of 6 micron, the gap spacing can vary from about 11 microns to about 15 microns and still be within the ±0.2% nonlinearity range. Hence, a substantial latitude in gap spacing can be achieved without sacrificing substantial linearity. On the other hand, when a higher output is desired, such as with a thinner diaphragm, the tolerance on the gap spacing decreases. Again noted in FIG. 10, a diaphragm thickness of 3 microns requires the gap spacing to be held at about 12.8±0.03 microns. The same analysis can be carried out on tolerance ranges of the diaphragm thickness to achieve transducer operations falling within specified ranges of nonlinearities.

A host of other graphs and families of lines can be derived which illustrate the operation of transducers with different diaphragm diameters, and yet other sets of graphs with different diaphragm prestrains. For a first family of curves, the pressure/deflection equation defined above can be employed to determine different diaphragm deflections, based upon a given pressure and a given diaphragm thickness. A different family of curves can be employed utilizing the same iteration technique for a different parametric value of diaphragm thicknesses. Other iterations can be carried out by varying the prestrain, as well as the full scale pressure. When the deflection of the diaphragm is found for each of the instances, the corresponding capacitance range can be calculated, also using the equations defined above. The output voltage employing a circuit using feedback can then be derived, also employing the algorithm noted above. Lastly, the linearity of the circuit can be ascertained by determining what the electrical output would be under ideal conditions, as compared to a practical system constructed in accordance with the principles and concepts of the invention.

The Table attached hereto as an appendix illustrates a computer printout after a few iterations of calculations to determine resultant linearities, based upon variations in predefined transducer parameters. The data illustrates an exemplary transducer in which the full scale deflection of the diaphragm is in response to a pressure equivalent to 3 inches of water. The capacitor diaphragm diameter is 200 mils, while a fluid conducting hole therein is 22 mils in diameter. The stray capacitance associated with such a structure is about 1.7 pf. Importantly, it has been found that contrary to textbook designations, the Young's modulus of silicon is numerically fourteen for thin membranes. This contrasts with the reported value of $26.2284 \times 10^6$ psi for thick silicon. The tabulated results provide an output voltage with feedback (Vo wfb), and a percent linearity of the system using the circuit feedback (L wfb).

As can be seen with this illustrative iteration, the diaphragm thickness is held constant at 10 microns, and the gap is incremented from 12 microns to 28 microns for different iterations of three diaphragm prestrains. The increased strain values are incremented upwardly from 60 microstrain to 100 microstrain by 20 microstrain increments. As can be seen, and as expected, when the radial microstrain increases, the deflection decreases. The first two lines of the Table indicate the tabulated results with regard to a transducer having a diaphragm prestrain of 60, are shown to be invalid data, as the deflection is substantially equal to the gap. While not indicated, a two micron deposition of material on the glass substrate forms the fixed capacitor plate and thereby decreases the gap parameter figure shown by a corresponding amount. With reference to the same section of the Table, a nonlinearity range of ±0.2% results in a very strict requirement on the capacitor gap. For example, the gap change between 18 and 19 microns results in a nonlinearity change, through zero, of −0.59 to +0.43, or a total nonlinearity of 1.02 percent. Since this is far outside the 0.2% range, a very tight tolerance on the gap parameter must be maintained. However, if such a tolerance could be maintained, a voltage output of between 0.584 and 0.539 volts could be attained. By forgoing such a large output voltage, the constraints on the capacitance gap tolerance can be relieved, while yet maintaining operation within the prescribed nonlinearity range. By increasing the prestrain to 100 microstrain, the nonlinearity passes through zero, with a gap tolerance between 19 and 20 microns. The nonlinearity range at this operational constraint is about 0.2%. However, the voltage output has decreased, but is yet well within a range for providing output electrical indications of changes in input pressure. In the example, the output voltage is between 0.336 and 0.315 for full scale diaphragm deflections of about 8.12 microns. While the example illustrates a technique for varying the prestrain to achieve acceptable nonlinearity and output voltage, a similar analyzation can be carried out on other similar computational results of different diaphragm thicknesses, while holding the prestrain constant.

As noted above, the computational results are calculated from the formulas noted above and provide an easy technique for ascertaining the various parameters of the transducer to achieve a desired output. In practice, it has been found that the computational figures correlate to a very high degree with actual transducer devices. Indeed, by selecting the various structural parameters of the transducer, the overall linearity of a transducer system can be corrected, even where feedback in the circuitry is not otherwise employed. As a result, by employing the invention, those skilled in the art can better understand the operation and the interaction of capacitive displacement transducers and techniques for improving the linearity thereof.

While the foregoing discussion generally describes the details of a clamped diaphragm type of transducer, the principles and concepts of the invention are applicable to a host of other types of transducers employing an element movable in response to a physical input stimulus. As an example, a planar diaphragm can be employed, and fixed to a support structure by a suspension element. In response to pressure, the planar element will not itself deform, but rather will move because of deflection or deformation of the suspension element. The suspension element transducer can be fabricated using models other than those described above to take into consideration the material stiffness so that nonlinearity of a desired sense and amount can be introduced, thereby offsetting other nonlinearities caused by extraneous capacitance, and the like.

From the foregoing, a transducer system is disclosed which provides a linear output without resorting to extraordinary, complex or high precision circuits. An important technical advantage of the invention is that by selecting various structural parameters of the transducer, a more linear output can be achieved. A more specific technical advantage of the invention is that inherent nonlinearities, such as due to extraneous capacitances, can be offset by introducing nonlinearities of another sense. A significant technical advantage of the invention is that third order nonlinearities occasioned by inherent stray capacitances can be identically offset by introducing third order nonlinearities of a different sense. An associated technical advantage presented by the invention is that by employing a stiffness factor by which a movable transducer element is deflectable, overall linearity of the transducer device can be improved. Yet another technical advantage of the invention is that based on the teachings and description above, various structural parameters of a transducer can be routinely selected to provide ideal results. Another technical advantage presented by the invention is that ideal linearity, or at least an acceptable range of nonlinearity can be achieved, while yet maximizing the output of the transducer. Yet another technical advantage of the invention is that an overall transducer system, including the sensor itself as well as an electrical circuit, provides optimal performance.

While the preferred embodiment of the invention has been disclosed with reference to a specific transducer device and circuit construction, it is to be understood that many changes in detail may be made as a matter of engineering choices without departing from the spirit and scope of the invention, as defined by the appended claims.

What is claimed is:

1. A method for controlling nonlinearities in a transducer having a movable member responsive to an input stimulus and in which nonlinearities of a first type degrade performance of the transducer, comprising the step of introducing into the transducer during manufacture thereof a nonlinearity of a second type defined by a stiffness which changes with an input, said nonlinearity being introduced into a constraining member attached to the movable member so as to offset the linearities of the first type and thereby control the overall nonlinearity of the transducer.

2. The method of claim 1, further including balancing the nonlinearities of said first type and said second type by selecting a thickness of the constraining member so that the nonlinearities of said first type are substantially offset.

3. The method of claim 2, further including selecting a gap dimension between said movable member and a capacitive plate for defining an output of the transducer.

4. The method of claim 3, further including imparting a predefined prestrain to said constraining member to adjust overall nonlinearity of the transducer.

5. The method of claim 1, further including reducing the overall nonlinearities of a capacitive transducer having a capacitance between a plate and the movable member by selecting a desired capacitive plate to movable member gap spacing and a thickness of said constraining member.

6. The method of claim 5, further including reducing the overall nonlinearity substantially to zero by selecting a particular gap spacing and constraining member thickness.

7. The method of claim 5, further including selecting said gap spacing to define a nonlinearity to said first type.

8. A method for controlling nonlinearities in a transducer having a movable member responsive to an input stimulus, and in which first type nonlinearities degrade performance of the transducer, comprising the steps of:
attaching said movable member to a fixed frame with a constraining support; and
constructing said constraining support with a material having a predefined thickness such that with changes in movement of said movable member said constraining support provides changes in resistance to said movement, said change in resistance defining a second type nonlinearity which offsets said first type nonlinearities to thereby control overall nonlinearities.

9. The method of claim 8, further including constructing said movable member and said constraining support as a clamped diaphragm.

10. The method of claim 9, further including constructing said diaphragm to provide a capacitive change in response to a change in an input stimulus to said transducer.

11. The method of claim 10, further including selecting a diaphragm thickness and a capacitive gap parameter so as to reduce said overall nonlinearities.

12. The method of claim 8, wherein the extent of said first type nonlinearities change with changing input stimulus, and further including constructing said constraining support and said movable member as a clamped diaphragm, and forming said diaphragm with a thickness to introduce the second type nonlinearity of an opposite sense which substantially tracks said first type nonlinearity with changing input.

13. The method of claim 12, further including constructing said diaphragm as a thin silicon membrane.

14. A method for controlling nonlinearities in a transducer having a member which is movable in response to an input stimulus, and in which there is an increase in sensitivity with an increase in the input stimulus, comprising the steps of:
   selecting a parameter of said transducer which decreases said sensitivity with increasing input such that an overall nonlinearity can be controlled, and selecting said parameter as a change in resistance of movement of said movable member with a change in input stimulus; and
   fabricating a transducer having the selected resistance of the movable member to control overall nonlinearity.

15. The method of claim 14, further including forming a connection of said movable member such that deflection thereof is enhanced, and thus there is an increased resistance to said deflection.

16. The method of claim 14, further including constructing said transducer with a thin clamped silicon diaphragm.

17. The method of claim 14, further including balancing third order nonlinearities of one sense by selecting transducer parameters which result in third order nonlinearities of a different sense.

18. The method of claim 17, further including selecting a capacitive gap spacing of said transducer to define the nonlinearity of said one sense, and selecting a stiffness of said movable member to define the nonlinearity of the different sense.

19. The method of claim 17, further including selecting a gap spacing and stiffness parameters so that the nonlinearity of said one sense and said different sense are balanced.

20. A method for constructing a transducer of the type having a member deflectable in response to an input stimulus to produce a change in output capacitance, comprising the steps of:
   selecting a gap spacing associated with said capacitance and constructing said movable member such that with increasing member deflection there is increased resistance to deflection so that a sensitivity of said transducer is made substantially independent of said input stimulus.

21. The method of claim 20, further including constructing said movable member as a clamped diaphragm.

22. The method of claim 21, wherein said gap spacing and a thickness of said diaphragm are selected to control nonlinearity of the transducer.

23. A method for reducing nonlinearities in a capacitive transducer of the type having an element movable in response to an input stimulus, comprising the steps of:
   selecting a parameter ratio comprising a displacement parameter of the movable member and a thickness parameter of a support structure which supports said movable member; and
   fabricating the support structure that supports the movable member to conform to said parameter ratio to thereby introduce a nonlinearity into the transducer for controlling the overall nonlinearity of said transducer.

24. The method of claim 23, further including selecting said thickness to provide said support structure with a defined variation of stiffnesses with deflection.

25. The method of claim 23, further including fabricating said movable member and said support structure as a clamped diaphragm.

26. The method of claim 23, further including selecting a capacitive gap parameter to achieve a desired nonlinearity for balancing with said introduced nonlinearity to achieve a desired output of said transducer.

27. A method for constructing a capacitive displacement transducer, comprising the steps of:
   forming a thin diaphragm;
   supporting said diaphragm at edges thereof so that said diaphragm is spaced apart from a capacitor plate by a gap to thereby define a capacitance; and
   selecting the gap spacing and the thickness of the diaphragm to substantially reduce an overall nonlinearity of said transducer.

28. The method of claim 17, further including reducing said overall nonlinearities to substantially zero.

29. The method of claim 27, further including supporting said diaphragm between a pair of plates to define a pair of capacitances, and further including connecting said transducer to an electrical circuit which converts capacitance to an electrical signal, an algorithm of said circuit comprising a ratio of reciprocal capacitive differences and a reciprocal summation to the pair of capacitances.

30. A method for defining dimensions affecting performance of a capacitive pressure transducer system, said system being of the type having a clamped diaphragm movable in response to a pressure and at least one fixed capacitance plate, comprising the steps of:
   a) for a given set of transducer dimensions and a given input pressure, determining the deflection of a large number of regions of said diaphragm;
   b) determining the capacitance(s) between said diaphragm and said capacitance plate(s) by summing the capacitance(s) between said diaphragm regions and said capacitance plate(s);
   c) determining the electrical output of the transducer system based upon a given capacitance-to-electrical output conversion algorithm;
   d) repeating steps a) through c) for a range of said pressures to determine the sensitivity and nonlinearity of said transducer system;
   e) repeating steps a) through d) for a range of said transducer dimensions to determine the effect of said transducer dimensions on sensitivity and nonlinearity; and
   f) selecting transducer dimensions to achieve a desired nonlinearity.

31. The method of claim 30, wherein said transducer dimensions that are varied are the thickness of said clamped diaphragm and the spacing between said clamped diaphragm and said capacitance plate(s).

32. The method of claim 30, wherein said transducer dimensions are varied to produce positive and negative nonlinearity values and a transition therebetween which passes through a zero nonlinearity.

33. The method of claim 30, wherein said transducer dimensions are varied to produce a desired sensitivity and a desired nonlinearity.

34. A method for reducing nonlinearity of a capacitive displacement transducer of the type having a movable member which is movable in response to an input physical stimulus, and at least one fixed capacitance plate, comprising the steps of:
   selecting a capacitive gap spacing between said fixed capacitance plate and said movable member to define a nonlinearity having a sense which increases sensitivity with increasing input;

selecting a thickness of a support element connected to said movable member to define a nonlinearity having a sense which decreases sensitivity with increasing input; and selecting said capacitive gap and said support element thickness so that the nonlinearity associated with the capacitive gap is substantially offset by the nonlinearity associated with said support element.

35. The method of claim 34, further including selecting a capacitive gap and support element thickness such that said overall nonlinearity is substantially constant over the operating range of the physical stimulus.

36. The method of claim 34, further including selecting said gap spacing and said thickness so that said increasing and decreasing sensitivities track substantially over the operating range of the transducer.

37. The method of claim 34, further including forming said support element and said movable member as a clamped diaphragm.

38. The method of claim 37, further including forming the thickness of said support element to comprise the thickness of said diaphragm.

* * * * *